United States Patent
Normark et al.

(10) Patent No.: US 8,170,536 B2
(45) Date of Patent: May 1, 2012

(54) PROVISIONING CONTENT FORMATTING IN A MOBILE DEVICE MANAGEMENT SYSTEM

(75) Inventors: Magnus Normark, Bromma (SE); Britt-Mari Svensson, Sollentuna (SE)

(73) Assignee: Smarttrust AB, Stockholm (SE)

(*) Notice: Subject to any disclaimer, the term of this patent is extended or adjusted under 35 U.S.C. 154(b) by 873 days.

(21) Appl. No.: 12/158,002

(22) PCT Filed: Dec. 12, 2006

(86) PCT No.: PCT/SE2006/001413
§ 371 (c)(1),
(2), (4) Date: Oct. 10, 2008

(87) PCT Pub. No.: WO2007/073278
PCT Pub. Date: Jun. 28, 2007

(65) Prior Publication Data
US 2009/0318123 A1 Dec. 24, 2009

(30) Foreign Application Priority Data
Dec. 19, 2005 (SE) ........................ 0502829

(51) Int. Cl.
H04L 29/08 (2006.01)
H04L 12/58 (2006.01)
H04M 3/00 (2006.01)

(52) U.S. Cl. .............. 455/414.4; 455/412.1; 455/418; 455/419; 455/420

(58) Field of Classification Search ............ 455/412.1, 455/414.4, 418, 419, 420, 466
See application file for complete search history.

(56) References Cited

U.S. PATENT DOCUMENTS

| | | | |
|---|---|---|---|
| 6,546,095 B1 | 4/2003 | Iverson et al. |
| 2003/0050062 A1 | 3/2003 | Chen |
| 2004/0082346 A1 | 4/2004 | Skytt et al. |
| 2004/0203648 A1 | 10/2004 | Wong |
| 2005/0181836 A1 | 8/2005 | Kamat |

FOREIGN PATENT DOCUMENTS
WO 2004023315 3/2004

OTHER PUBLICATIONS
Open Mobile Alliance Ltd., "DM Smart Card Requirements" Nov. 2005.

*Primary Examiner* — Un C Cho
(74) *Attorney, Agent, or Firm* — Fasth Law Offices; Rolf Fasth (57) ABSTRACT

The method is for provisioning content formatting in a device management system to facilitate provisioning of mobile devices of different capabilities with contents in a device management system in a mobile network infrastructure. The system has a device management application and repositories. The device management application in the device management system is initiated to perform provisioning content formatting. The device management application determines the applicable format for a mobile device to be provisioned on an analysis based on combining the capabilities of the mobile device identified by means of one or more of the repositories.

27 Claims, 4 Drawing Sheets

PROVISIONING CONTENT FORMATTING IN A MOBILE DEVICE MANAGEMENT SYSTEM

PRIOR APPLICATIONS

This is a US national phase patent application that claims priority from PCT/SE2006/001413 filed 12 Dec. 2006, that claims priority from Swedish Patent Application No. 0502829-5, filed 19 Dec. 2005.

TECHNICAL FIELD

Method for provisioning content formatting in a device management system in order to facilitate, provisioning of mobile devices of different capabilities with content in a device management system in a mobile network infrastructure, the system comprising a device management application and repositories

BACKGROUND AND SUMMARY OF THE INVENTION

The Global System for Mobile Communication (GSM) is a standard for digital wireless communications with different services, such as voice telephony. The Subscriber Identity Module (SIM) inside GSM phones was originally designed as a secure way to connect individual subscribers to the network but is nowadays becoming a standardized and secure application platform for GSM and next generation networks.

The Mobile Station (MS) is what the user ever sees from the whole system. The MS actually consists of two distinct entities. The actual hardware is the Mobile Equipment (ME), which consists of the physical equipment, such as the radio transceiver, display and digital signal processors. The subscriber information is stored in the Subscriber Identity Module (SIM), implemented as a Smart Card.

With respect to the terminology used in this document, The Mobile Station (MS) includes the Mobile Equipment (ME) and the Subscriber Identity Module (SIM). The terms "Handset" and "Terminal" are used as a synonym to the Mobile Equipment (ME) and the term "Mobile device" as a synonym to The Mobile Station (MS).

The mobile equipment is uniquely identified by the International Mobile Equipment Identity (IMEI) being a unique code that corresponds to a specific GSM handset while the SIM card, in turn, is identified by the Integrated Circuit Card Identity (ICCID) determining the serial number of the card, and contains the International Mobile Subscriber Identity (IMSI), identifying the subscriber, a secret key for authentication, and other user information. The IMEI and the IMSI or MSISDN are independent and can thereby provide personal mobility.

The Mobile Station Integrated Service Digital Network Number, MSISDN, is the standard international telephone number used to identify a given subscriber. The operator declares the subscription in a database inside the network, which holds the correspondence between the IMSI and the MSISDN. By inserting the SIM card into another GSM terminal, the user is able to receive and make calls from that terminal, and receive other subscribed services.

Advanced mobile services such as browsing, multimedia messaging, mobile e-mail, and device management can only be used if a mobile phone is configured correctly. However, many customers do not know how to configure their device. Operators must ensure that device configuration is quick and easy for the customer. This process of managing device settings and applications is called device management.

A device management session includes e.g. authentication (user verification), device inventory (a device management application read which parameters and applications are installed in the telephone for future decisions, such as e.g. updating, adding and deleting things from the installations), continuous provisioning (a device management application e.g. updates parameters on the telephone device, sends applications to the device, performs software and firmware updates), device diagnostics (error finding), etc.

Sending new settings over the air is one simple way to provision a device with configuration parameters, such as connectivity information (device settings). After receiving the settings to configure the phone, the customer simply saves them to the phone and is then able to use the services. For the operator, simplifying access to advanced services can bring higher usage rates, new revenue streams, and reduced customer helpline costs.

However, a mobile device consists of two entities: the subscriber identity module (SIM) and the terminal. In a mobile device management environment both entities that make up the "device" are of interest. Both those entities are subject to mobile device management operations.

In a unified device management environment a "device" consists of two entities. For some devices it is the data objects residing in the terminal that are targeted and sometimes it is data objects residing on the SIM. This means that the format of the provisioning content is significantly different even if the parameters may be the same. It is a jungle to keep track of the details of how a particular mobile device needs to be managed.

It is also a problem that there might be different solutions for different mobile devices. One device might have Multimedia Message Service (MMS) settings on the SIM card and another device might have them in an OMA DM management Object (MO) in the terminal.

Furthermore, the fact that a mobile device consists of two independent units, the terminal and the SIM, introduces an additional level of complexity. The SIM card might support storing of MMS settings on the SIM card but then there has to be an application program in the terminal that supports reading the settings off the SIM card.

Therefore the capabilities of both the SIM and the terminal need to be analysed in combination in order to determine the applicable provisioning protocol and provisioning content format. To simply look at the capabilities of the terminal alone will not be enough.

For devices supporting OMA DM, data residing in the handset is represented by standardized Management Objects (MO) as specified by the OMA DM protocol. The protocol specifies how the MOs may be managed (i.e. read, updated, deleted . . . ) by a remote server side component. There are just a few, three actually, MOs that are specified as mandatory. In addition to those mobile device vendors will implement more MOs according to their own needs and ideas.

There are also plenty of "legacy" devices that have data stored in the handset in a non-specified proprietary way and in such cases there is sometimes a proprietary device management protocol available that is adhered to by one or more terminal manufacturers. The device management protocols used for communicating with terminal residing application programs and SIM residing application programs are essentially different. The application programs and their respective communication protocols have evolved one by one often on a proprietary basis. Some companies, have published their own specifications of protocol and format for provisioning their mobile devices with e.g. connectivity parameters over-the-air (OTA). Such proprietary "legacy" OTA provisioning protocol are still being used.

There are multiple data objects specified for storing the same data. Multiple standards and specifications exist for how to maintain connectivity parameters in a mobile device, e.g. on the SIM card, in an MO in the OMA DM user agent, as an XML document or proprietary somewhere in the phone.

However, it seems like more generic standards for mobile device management are emerging, i.e. OMA DM protocol. Never the less there are and will be plenty of old ("legacy") devices out there on the network. The OMA DEM protocol is still far from mature, deployed, ready-to-go or interoperable.

OMA Device Management Protocol (OMA DM) is a standard for communication between mobile devices and device management server systems. The standardization body is OMA, Open Mobile Alliance. The mobile device to be managed is equipped with an OMA DM user agent in the device (i.e. terminal or handset) that speaks the OMA DM language.

Device management applications using OMA DM are typically used by mobile service providers. They are used for customer care purposes and to increase revenue by effective value added service management. Example use-cases involve service- and settings provisioning, device diagnostics, statistics, firmware- and software upgrade.

In this document, a system that is able to manage both the handset and the SIM card is referred to as a Unified Device Management system (UDM). In the scope of UDM, both the SIM residing and the terminal residing data and application programs are of interest and must be managed.

In this document, the term SIM file management (SFM) is used for device management operations towards SIM cards. Data residing on the SIM are represented by a SIM file structure where a file is indicated by a file path. How the data in the SIM files should be encoded is specified to the transport level as well as to the application level. There are several standards around, both from 3rd Generation Partnership Project (3GPP) and Open Mobile Alliance (OMA). The original scope of 3GPP was to produce globally applicable Technical Specifications and Technical Reports for a 3rd Generation Mobile System based on evolved GSM core networks and the radio access technologies that they support and was subsequently amended to include the maintenance and development of the Global System for Mobile communication (GSM) Technical Specifications and Technical Reports including evolved radio access technologies.

To keep track of what SIM card and terminal that has what files and what data management objects, capabilities are used. For example a terminal may be capable of using the OMA DM device management protocol by an OMA DM user agent supporting OMA DM version 1.2, by an OMA DM user agent supporting a number of optional OMA DM functions or it might be capable of accepting unprompted notification messages of Multipurpose Internet Mail Extensions (MIME) type. MIME extends the format of Internet.

By keeping track of such capabilities, adaptive processes may be implemented, that automatically selects and imposes the applicable device management protocols and formats. Of course, the foundation of it all is that the system is aware of the mobile device identity and has repositories storing capabilities for both SIM cards and terminals.

Throughout this document, and also in standards, the term "provisioning content" (PC) is frequently used. Provisioning content is the content being provisioned. Content is like payload. In the use-case "provisioning of device settings" the provisioning content is the set of connectivity parameters. But this is just one use-case. The content in other use-cases may be e.g. software of some sort, a game, a picture or a firmware update package.

Whatever the content is it always has a dedicated format. The same provisioning PC may be provisioned to various different devices over various different protocols and packaged in various different formats.

The capabilities of the mobile device reveal what features, provisioning protocols and provisioning content formats it is capable of understanding.

This means that, in the present situation, "bridging features", "adaptive processes", "automatic conversion features" and "data management tools" are or would be extremely useful in order to enable seamless migration and easy-to-use future proof mobile device management systems. There will be a lot of "legacy" devices out there for quite some time yet. Meanwhile, screening out devices based on their capabilities is of essential importance.

Capabilities aware processes, meaning the terminal capabilities as well as SIM card capabilities. Capabilities refer to both "hard" capabilities such as mobile transport capabilities and more "soft" capabilities such as the presence of certain application programs on the terminal or SIM. Capabilities repositories enable screening out of devices with certain desired capabilities.

Unifying management of SIM card and terminal, seamless migration back and forth, uniform interfaces for UDM applications including automated protocol conversion Bridging features, enabling uniform use-case based system that operates smoothly even as SIM cards and terminals evolve over time, causing a ruthless demand for yet new device management protocols and data formats again and again. Bridging features ensures seamless migration from one protocol to the next. In addition, bridging features ensures seamless management of all generation of devices existing at the same time in one and the same mobile device management system.

Thus, the correct format for a provisioning content is determined by a complex combination of capabilities: the OTA protocol, even the OTA protocol version, the terminal vendor, terminal model, the subscription type and the SIM card type. It is very complex to know by which provisioning content format a mobile device may be provisioned.

US patent application 2005055453 is presented as prior art. This patent is held by Microsoft and covers a specific conversion, from WAP client provisioning XML representation into OMA DM tree structure representation. The method in this patent does not include the use of capabilities to determine what conversion that is applicable. It is a straight forward computerized conversion where data objects of one format are mapped onto data objects of another. In addition the patent is limited to conversion between to specific formats.

Continuously, new mobile devices are introduced to the fleet and demanding new provisioning content formats over and over again. It is therefore not very future proof to configure the system with a few existing provisioning content formats.

The object of the invention is to develop methods and systems facilitating formatting of provisioning content destined for mobile devices of different capabilities and installations using different standards and protocols.

The method of the invention is intended for provisioning content formatting in a device management system in order to facilitate provisioning of mobile devices of different capabilities with contents in a device management system in a mobile network infrastructure. The system comprising a device management application and repositories, and the method is mainly characterized by steps in which the device management application in the device management system is initiated to perform provisioning content formatting, and the device management application determines the applicable format for a mobile device to be provisioned on an analysis based on combining the capabilities of the mobile device identified by means of one or more of the repositories.

The system of the invention structure comprises one or more device capabilities repositories and a device management application used for the determination of correct provisioning content format based on the capabilities of the mobile device and device capabilities repositories.

The invention covers an adaptive process for converting between different provisioning content formats and provides possibilities for automated capability based automatic conversion of provisioning content from a generic format into one of multiple other formats.

In the invention, the conversion is automatic, meaning that the determination of format to convert to is done based on the capabilities of the mobile device in question. A major part of the method of the invention is to determine which provisioning content format that is applicable for a particular mobile device when a particular mobile device management use-case is executed. Especially, the invention emphasizes the combination of SIM card capabilities and terminal capabilities during the analysis process in which the applicable provisioning content format is determined.

The method implements an automatic process to determine which provisioning content format that is applicable by the use of a terminal capabilities repository and a SIM card capabilities repository.

In the invention, repositories for terminal capabilities and SIM card capabilities are used for the process of determining the provisioning content format. Capabilities repositories are essential for managing the provisioning. For example: in some mobile device model it is the provisioning content resides in terminal media and in some other it resides on-SIM. It is the same old connectivity parameters, but the provisioning protocols and content formats are significantly different depending on where and how it is stored in the mobile device The invention covers conversion into formats applicable for both SIM residing data objects and terminal residing data objects. The formats may be any, both standardised formats as well as proprietary formats. Nowadays most mobile devices support some kind of Over-The Air (OTA) provisioning. There are OTA provisioning protocols for terminal residing data and SIM residing data.

For terminal residing data objects, there are s.c. a) "Legacy" protocols that are based on short messages (SMS) to carry the provisioning content using to a dedicated data format of the application data unit. The legacy protocols use several vendor specific (proprietary) formats to carry the provisioning content, b) an Open Mobile Alliance (OMA) Client Provisioning specification that uses an XML document to carry the provisioning content. The dedicated OMA specification that specifies the provisioning content markup, c) an OMA DM Bootstrap specification that uses an XML document to carry the provisioning content. This markup is different from the OMA CP markup, i.e. have a different format.

For SIM residing data objects, there is the Remote File Management (RFM) protocol, which is the OTA provisioning protocol carried over SMS. Part of determining the provisioning content "format" is the process to determine the identity of the files (EF) to which the provisioning content shall be written. Part is to determine how the provisioning content itself should be encoded. Part is also to determine by the SIM card type whether there is any particular flavour of RFM protocol to be used. In the SIM case, protocol and format is therefore tightly connected In order to implement the determination process, by which the correct provisioning content format is selected there is a need for terminal- and SIM card type specific capabilities repositories as described in the previous chapter.

The method and system implements:

A generic provisioning content format on which the provisioning content is administratively managed in the system Device management repositories facilitating the possibility to determine the correct provisioning content format based on the capabilities of the terminal and the SIM card constituting the mobile device:

A terminal capabilities repository (TCR) storing information about what application services, technologies and so on that a terminal is capable of. The TCR also stores information about what OTA provisioning protocols a terminal may be provisioned over and specific information about provisioning content format particulars when so needed.

A SIM card capabilities repository (SCR) storing information about the management objects (files) available on the SIM card and whether or not these file may be managed from remote.

A subscription- and SIM card relationship repository storing information about the capabilities of the SIM card for a particular subscription. Thereby this repository provides the means to match a subscription with a SIM card type.

A device identities repository (DIR) storing the mobile device identities as identified by a terminal identity and a subscription identity [IMEI, MSISDN].

An automatic conversion process that executes the formatting, from the generic format into either of a number of several optional provisioning content formats Once the applicable format has been determined the method automatically implements the actual conversion from a generic provisioning content format into the other in the particular case applicable format. Thus, the process is based on the use of a generic Provisioning Content (PC) format on which all content is stored in the system. The adaptive process is then employed to convert from the generic PC format in to the applicable PC format based in the capabilities of the mobile device targeted.

The Capability based automatic provisioning content formatter has been invented to solve the problems of the vast number of different provisioning content formats required in a mobile device management system. There is a need for many different formats because there are so many different mobile devices around.

Which protocol and format that is applicable will depend on a complex combination of all of the device capabilities. For example, for one mobile device settings for MMS might be residing in a SIM file and settings for OMA DM in an MO in the terminal. While for another terminal both kind of settings are stored in MOs in the terminal. Considering this complex nature of mobile device management it becomes apparent that adaptive processes are absolutely necessary and that a "One size fits all" is definitely not possible. The invention covers conversion into formats applicable for both SIM residing data objects and terminal residing data objects. The formats may be any, both standardised formats as well as proprietary formats.

Conversion in run-time is one option, to systematically build and format PC into retrievable "packages" indexed by capabilities is another. It is, however, not significant to the invention what method is implemented.

The invented adaptive process is referred to as Capabilities based automatic PC formatter, abbreviated CPC formatter. The invented CPC formatter makes sure that a mobile device management system, on user level, can implement a simple and generic management of the provisioning content (e.g. connectivity parameters). The system user need not be concerned with all the different formats, just the content itself. The selection of appropriate format and the actual formatting is handled transparently by the CPC formatter.

The following characteristics of the invention are presented to have a special relevance:

It is based on a capabilities aware mobile device management process

The significant characteristic here is that the system is aware of both SIM card capabilities AND terminal capabilities.

There is a terminal capabilities repository and a SIM card capabilities repository. The combination of the two forms a characteristic benefit and unique value of the invention.

The invention provides seamless integration of SIM card management and terminal management By seamless is meant that even though sometimes a provisioning content is bound for the SIM and sometimes for the terminal, conversion into appropriate format is handled automatically.

The simplified administration of the data parameters of the provisioning content is a unique value of the invention. The user need not be concerned with the format that will actually be used in the end when a terminal or SIM is being provisioned. The user need only administer the correct values on the data parameters are entered into the system. It is future proof. New formats can be added without re-entering the data parameter values.

In the following the invention will be described by means of some typical examples by referring to figures. The intention is not to restrict the invention to these examples because they are presented to illustrate the invention only.

DETAILED DESCRIPTION

Figure 1:
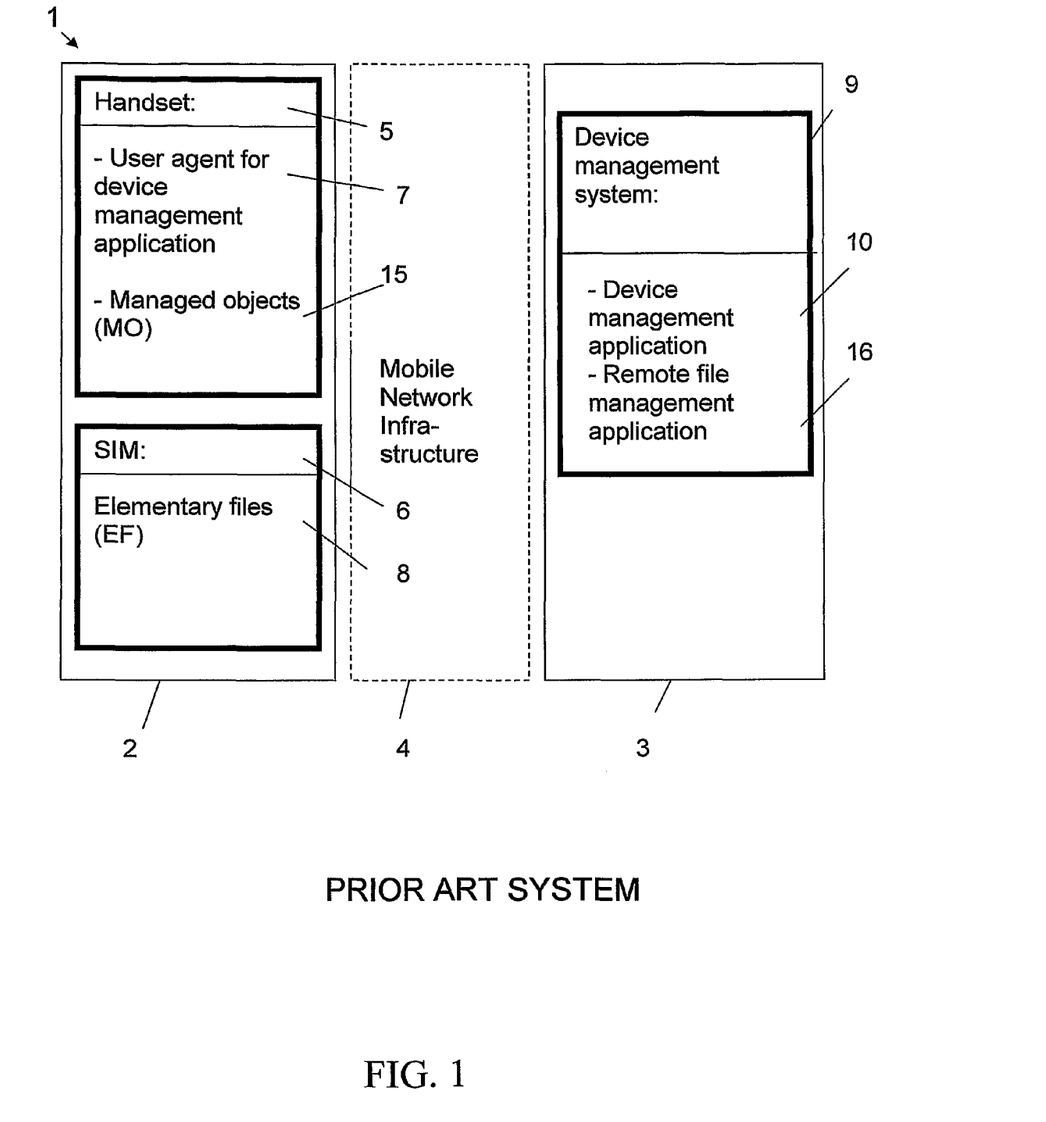
FIG. 1 is a view of a prior art target environment without the invention

FIG. 1 is a view of a prior art target environment without the invention. The target environment is presented as an example of a telecommunication network 1 in which the invention can be used. The telecommunication network 1 comprises one or more devices to be provisioned, of which one device 2 and a device management server 3 can be seen in FIG. 1. The device 2 to be provisioned is in this example a mobile device 2 belonging to the mobile network infrastructure 4.

The Mobile Station (MS) (=The device) represents the only equipment the GSM user ever sees from the whole system. It actually consists of two distinct entities. The actual hardware is the Mobile Equipment (ME) (=handset) marked with reference number 5 in FIG. 1, which consists of the physical equipment, such as the radio transceiver, display and digital signal processors. The subscription information is stored in the Subscriber Identity Module (SIM), marked with reference number 6 in FIG. 1, implemented as a Smart Card.

In this context, the mobile network infrastructure includes all components and functions needed for mobile data communication, both GSM and internet included. The mobile device 2, in turn, includes both the handset 5 and the SIM card 6. Thus, the mobile device 2 has access to the mobile network infrastructure 4.

OMA Device Management Protocol (OMA DM) is one standard for communication between devices and applications in device management systems. If this standard is used, the device to be managed (for example provisioned), i.e. the mobile station 2 in FIG. 1, is equipped with an OMA DM user agent 7 in the device 2 that speaks the OMA DM language. With other device management protocols, the user agent 7 is a user client for the particular device management application used in the device management system 9. The data entities residing in the handset 5 (i.e. Mobile Equipment (ME)) are represented by standardized Managed Objects (MO) 15. When the protocol used is OMA DM, these are specified by the OMA DM protocol.

The data entities residing in the SIM card, in turn, are represented by a logical structure of files, including the Elementary Files (EF) having reference number 8 in FIG. 1.

The SIM files 8 can be remotely managed by standardized commands for remote file management by means of a standardized remote file management application 16, such as RFM, in the device management system 9. The device management system 9 of FIG. 1 also has a device management application 10 for managing the managed objects (MO) 15 using a device management protocol, which e.g. can be OMA DM, which is typically used by mobile service providers. The applications 10, 16 are in reality on different servers and thus the server 3 has to be considered as a common expression for applications on server side. The applications are used for customer care purposes and to increase revenue by effective value added service management.

Thus, in summary, the mobile device 2 of FIG. 1 comprising the handset 5 and the SIM card 6 is subject of device management in a multi-protocol mobile device management environment. The data entities 15, i.e. the managed objects, in the handset are then manipulated by management operations carried over a standardized protocol, i.e. the OMA DM protocol in this example. The user agent 7 is the client side component required to carry out device management operations over the OMA DM protocol. The data entities 8, i.e. the elementary files, in the SIM card may in turn be manipulated by management operations carried over Remote File Management (RFM) protocols. The data entities, MO's and EF's, may not be managed over the same device management protocol.

A device management session includes e.g. provisioning meaning that the device management application e.g. updates parameters on the telephone device, sends applications to the device, and performs software/firmware updates. Thus, sending new settings over the air is a way to provision a device with configuration parameters, such as connectivity information (device settings). After receiving the settings to configure the phone, the customer simply saves them to the phone and is then able to use the services.

In provisioning, for some devices it is the data objects residing in the terminal that are targeted and sometimes it is data objects residing on the SIM. This means that the format of the provisioning content is significantly different even if the parameters may be the same. It is also a problem that there might be different solutions for different mobile devices. Furthermore, the fact that a mobile device consists of two independent units, the terminal and the SIM, introduces an additional level of complexity. The SIM card might e.g. support storing of MMS settings on the SIM card but then there has to be an application program in the terminal that supports reading the settings off the SIM card.

Figure 2:
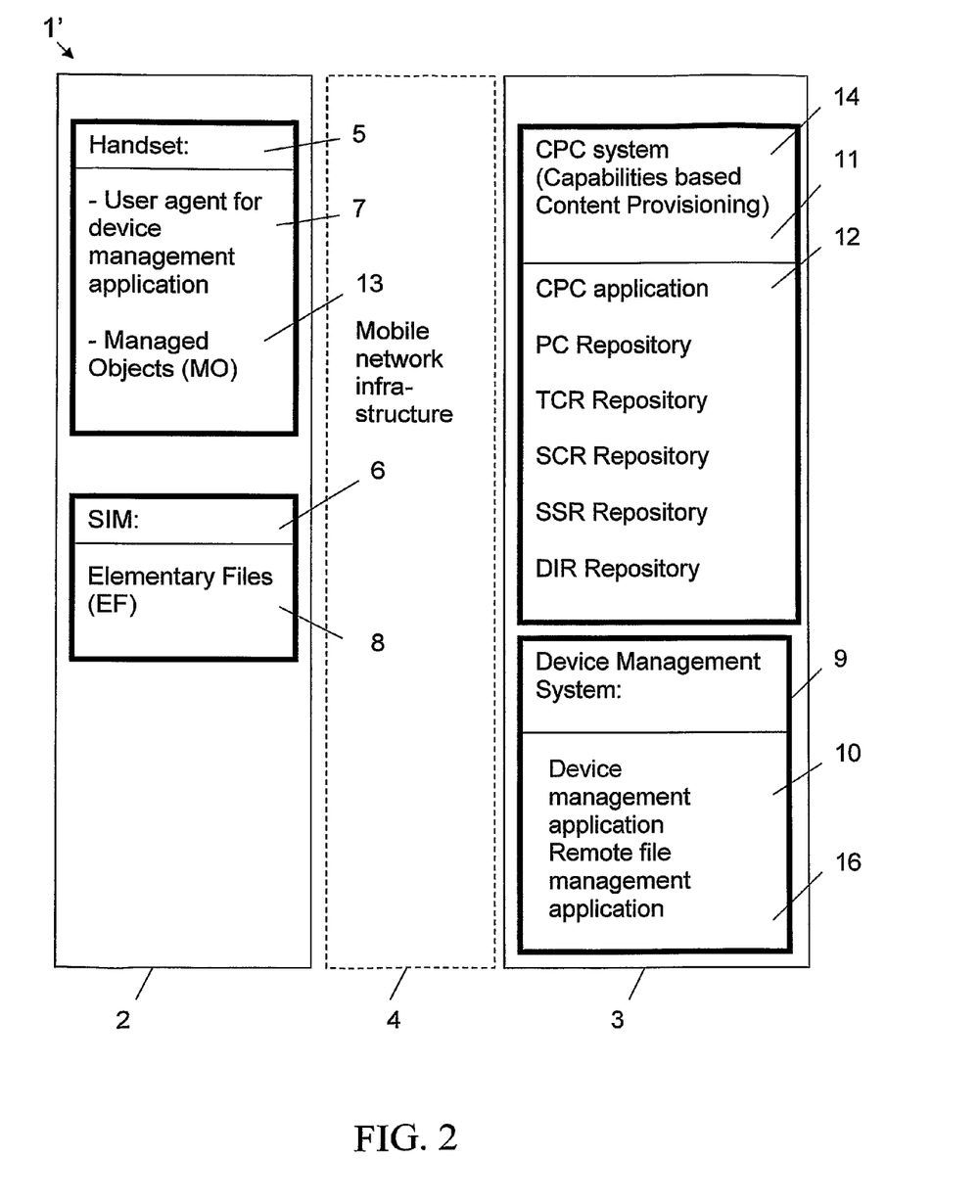
FIG. 2 is a view of an environment including the entities that implements the invention

FIG. 2 is a view of an environment that includes the entities that implements the method of the invention in addition to those presented in FIG. 1. The system 1' in FIG. 2 comprises components residing on both the mobile device 2 in FIG. 2 and on the server side 3 in FIG. 2. Again the server side in the reality consists of several servers, one for each device management application and one for the Capabilities based Provisioning content formatter (CPC) system. The server including the CPC system 14 is in practice in an own server between the different device management applications 10,16.

The CPC system comprises
- a CPC formatter application 11, which performs inventive functions in the method of the invention
- a Provisioning Content Repository (PC) 12 that has been created so that a provisioning content (e.g. connectivity parameters (data)) are read into the repository. In this repository, there might for example be one set of connectivity parameters for OMA DM. The content is stored in a generic format.
- a Device Identities Repository (DIR) storing the mobile device identities as identified by a terminal identity and a subscription identity [IMEI, MSISDN]. Device Identity Repository is needed for the device discovery and for figuring out if this device should be an object for device management operations. It is needed before the inventive part of method.
- a Terminal Capabilities Repository (TCR) storing information about what OTA provisioning protocols a terminal may be provisioned over. TCR also stores specific information about provisioning content format particulars when so needed. And the technology and application service capabilities.
- a SIM Card Capabilities Repository (SCR) storing information about the management objects (files) available on the SIM card and whether or not these file may be managed from remote.
- a Subscription- and SIM card relationship repository (SSR) storing information about the capabilities of the SIM card for a particular subscription. Thereby this repository provides the means to match a subscription with a SIM card type.

In FIG. 1, the DIR, TCR and SCR databases are together presented with the same reference number 17 even if they are separate databases.

The correct format for a provisioning content is determined by a complex combination of capabilities: the OTA protocol, even the OTA protocol version, the terminal vendor, terminal model, the subscription type and the SIM card type. It is very complex to know by which provisioning content format a mobile device may be provisioned with.

The capabilities of the mobile device reveal what features, provisioning protocols and provisioning content formats it is capable of understanding.

Thus, in summary, the mobile device 2 of FIG. 1 comprising the handset 5 and the SIM card 6 is subject of provisioning in an environment with several formats.

The data is provisioned over a standardized protocol, i.e. the OMA DM protocol in this example. The user agent 7 is the client side component required to carry out device management operations over the OMA DM protocol.

The invention covers an adaptive process for converting between different provisioning content formats and provides possibilities for automated capability based automatic conversion of provisioning content from a generic format into one of multiple other formats.

In the invention, the conversion is automatic, meaning that the determination of format to convert to is done based on the capabilities of the mobile device in question. A major part of the method of the invention is to determine which provisioning content format that is applicable for a particular mobile device when a particular mobile device management use-case is executed.

The method implements an automatic process to determine which provisioning content format that is applicable by the use of a terminal capabilities repository and a SIM card capabilities repository. In the invention, repositories for terminal capabilities and SIM card capabilities are used for the process of determining the provisioning content format.

Figure 3:
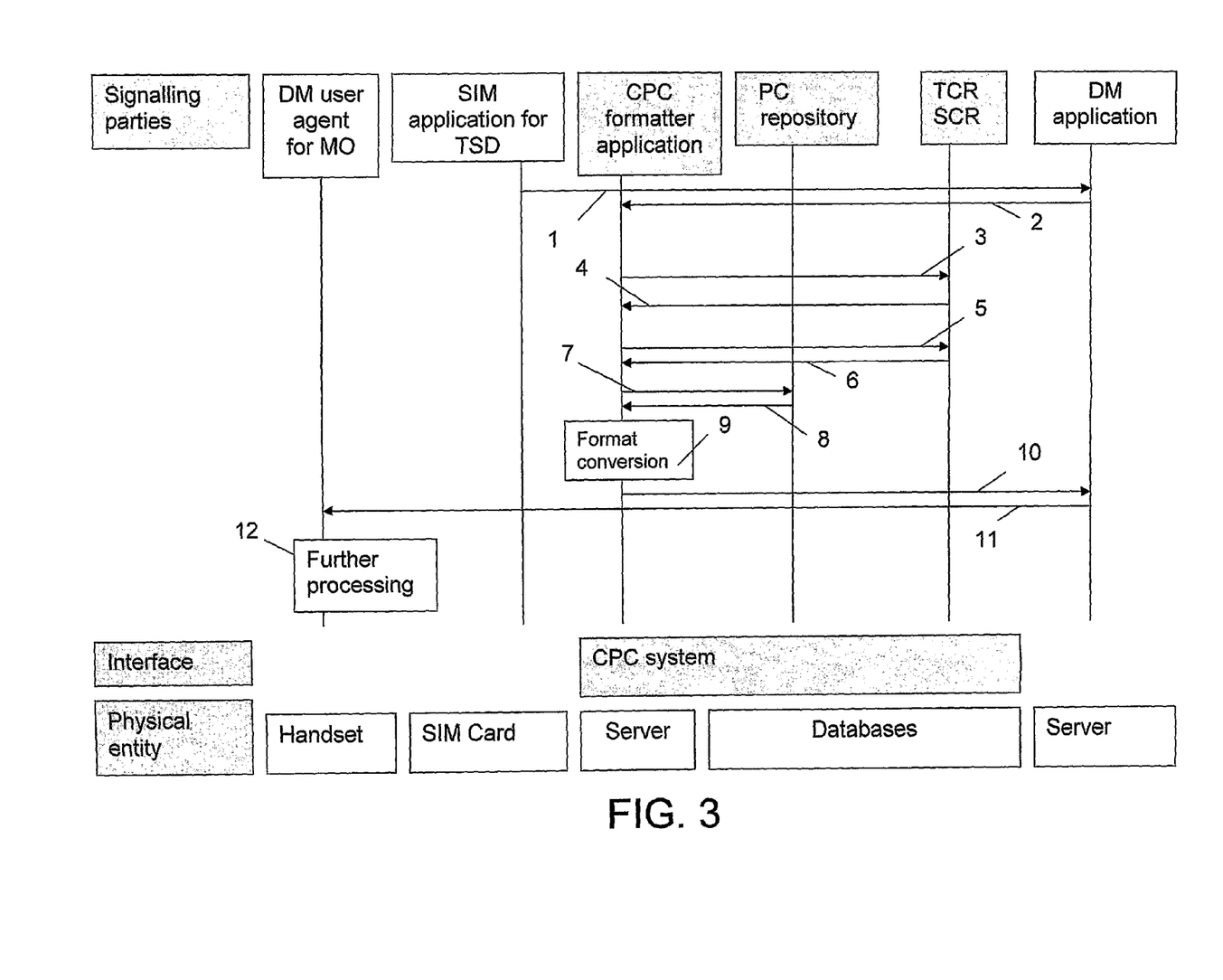
FIG. 3 presents a signal diagram of how provisioning of contents in devices might take place, when the provisioning content is terminal bound

FIG. 3 presents a signal diagram of how provisioning of mobile devices with content might take place, when the provisioning content is terminal bound (but the provisioning content can also be SIM card bound).

FIG. 3 shows on the lowest row, the physical entities taking part in the method of the invention. These are the handset (equipment) and the SIM card, the servers on the server side, and the databases described above.

On the highest row of FIG. 3, the signaling parties in the system of the invention comprises the client side user agent for DM (in the handset), a SIM DM application (which is in the SIM card and handles the files), another SIM application that performs detection of terminal switches, a server side DM application (in the server side Device Management System).

The inventive part of the system is shadowed in FIG. 3. The inventive part is a system called Capabilities based Provisioning Content formatter (CPC). It comprises A CPC formatter application, which performs inventive functions in the method of the invention by means of the repositories described above in connection with FIG. 2, i.e. the Provisioning Content Repository (PC), the Device Identities Repository (DIR), the Terminal Capabilities Repository (TCR), the SIM Card Capabilities Repository (SCR) and the Subscription- and SIM card relationship repository (SSR).

Device management applications using e.g. OMA DM are typically used by mobile service providers. They are used for customer care purposes and to increase revenue by effective value added service management. Example use-cases involve service- and settings provisioning, device diagnostics, statistics, firmware- and software upgrade.

It is now assumed that e.g. a Service Provider or an operator wish to perform provisioning of contents in devices in a device management system in a mobile network infrastructure of e.g. a reason listed up in the foregoing paragraph.

In step 1 of FIG. 3, the server side mobile device management application system is triggered to perform provisioning of settings (such as OMA DM connectivity parameters) for a device for which the mobile device identity is known, i.e. the [IMEI, MSISDN] is known.

Generally, triggering might be performed with different methods.

Automatic triggering takes place at a pre-defined event such as e.g a terminal switch, i.e. when a user has changed his terminal a terminal switch has taken place. The terminal switch event is detected by an application on SIM (i.e. the SIM card notices when the user has switched terminal). The SIM application sends information about the terminal switch event Over-The-Air (OTA) to a server side device management application. The information about the event includes information about the device identity, that is, the on-SIM application provides the device identity [IMEI, MSISDN] for the server side DM application.

Another possible triggering method is "network based" terminal switch detection, where the terminal switch event is detected by analysis of traffic data in the mobile network.

Instead of automatic triggering, "self-provisioning" might be used. In this case provisioning is triggered be the end-user, either via the mobile device or via a web application on the internet. In the first case, the self-provisioning application on the mobile device is capable of providing the device identity [IMEI, MSISDN] upon requesting the provisioning. In case of self-provisioning via a web application, the end-user must supply information about the device identity, that is, indicate the phone number and mobile device model.

In customer care initiated provisioning, the provisioning is manually triggered by an operator that has knowledge about the device identity e.g. learnt by conversation with a subscriber.

In FIG. 3, the triggering is assumed to take place by the SIM application terminal switch detection method (even if the invention of course is not restricted to that). This is performed by signal 1 from the SIM application (intended for terminal switch detection) to the server side DM application.

In signal 2, the mobile device management application requests the CPC formatter application to convert the provisioning content into the applicable format for the given mobile device identified by means of the received signal 1 that contained the MSISDN and/or IMEI information.

The CPC formatter then retrieves the terminal type indicator out of e.g. the IMEI sent with signal 2 and looks the OTA provisioning protocol up in the TCR by means of signals 3 (request) and 4 (receiving the requested information). Now the particular OTA protocol, which has to be used for the provisioning of this particular mobile device is known.

The CPC formatter then looks up the provisioning content format of the OTA protocol and terminal type and SIM card type by means of signals 5 and 6.

In this example, signal 6 gave the information that the provisioning content is terminal bound, i.e. it is objects residing in the terminal that needs updating. In other words, the provisioning content is bound for the OMA DM client (user agent) in the terminal.

Thereafter, CPC formatter fetches the generic format of the provisioning content form the PC repository in signals 7 and 8 and then in step 9 it converts the provisioning content from the generic format into the correct format (for example a wapprovisioningdoc.xml file) i.e. the format found to be the correct one (information in signal 6) for the actual mobile device in question.

In signal 10, the CPC formatter then returns the provisioning content on the applicable format to the server side DM application.

In signal 11, the mobile device is provisioned with the provisioning content and as signal 6 gave the information that the provisioning content is terminal bound, it is the DM user agent the terminal signal 11 (the provisioning data) is sent to. (in another embodiment, which is not illustrated, the signal 6 might give the information that the provisioning content is SIM card bound, then it would be the application on SIM handling files signal 11 (the provisioning data) is sent to.

In signal 12, the DM user agent in the mobile device further processes the provisioning content, i.e. installs the device settings, and then the device has been bootstrapped. (Bootstrapping means moving a mobile device from an empty state to a state where the mobile device is able to initiate a session with a management server or any other application service it has been bootstrapped for).

Figure 4:
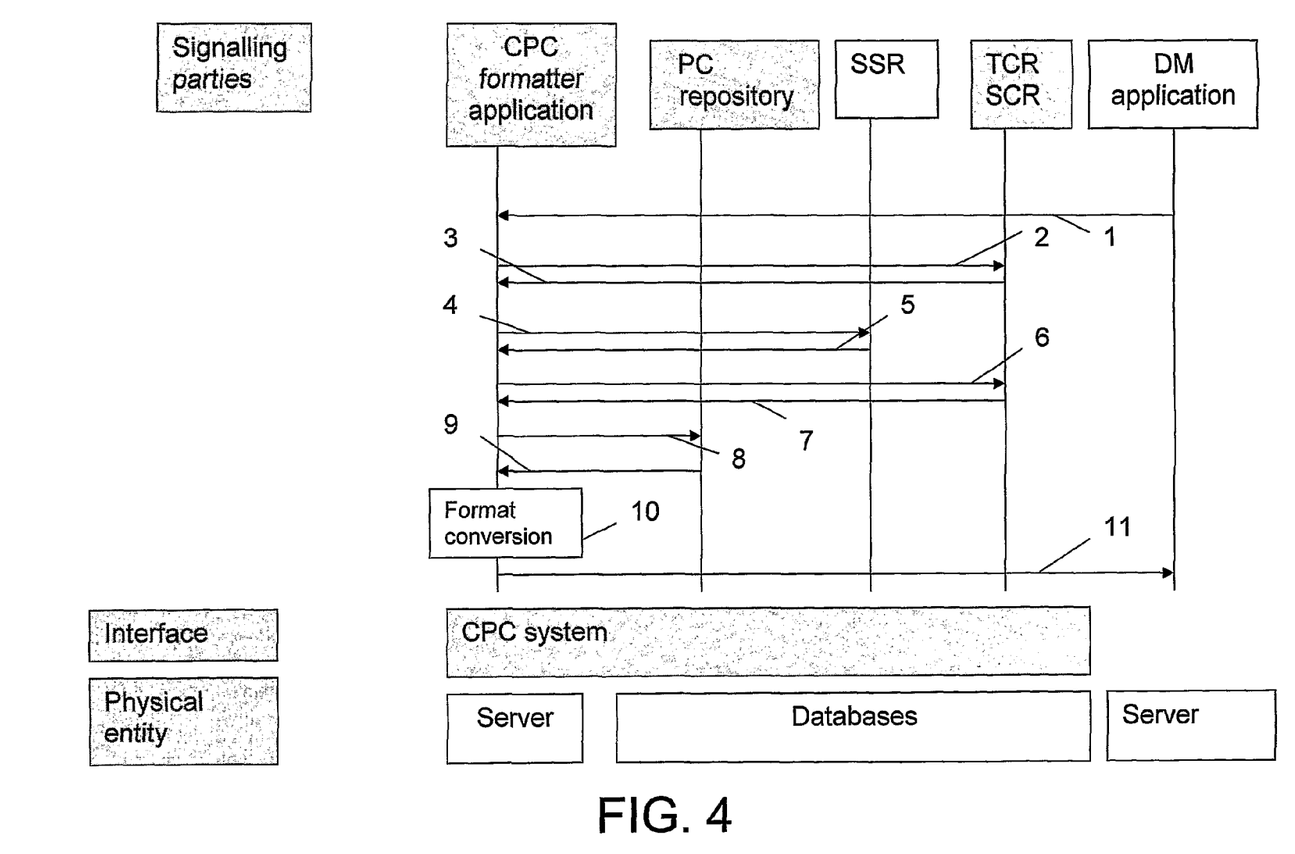
FIG. 4 presents an example of the method of the invention for provisioning content formatting

FIG. 4 presents an example of the method of the invention for provisioning content formatting. Everything takes place in the inventive part of FIG. 3.

FIG. 4 shows on the lowest row, the physical entities taking part in the method of the invention. These are the servers on the server side, and the databases described above.

On the highest row of FIG. 4, the signaling parties in the system of the invention comprises the server side DM application (in the server side Device Management System) and the signaling parties in the inventive part of the system already described in connection with FIG. 3, i.e. a CPC formatter application, which performs inventive functions in the method of the invention by means of the repositories described above in connection with FIG. 2, i.e. the Provisioning Content Repository (PC), the Terminal Capabilities Repository (TCR), the SIM Card Capabilities Repository (SCR) and the Subscription- and SIM card type relationship repository (SSR).

The device management application in the device management system is initiated to perform provisioning content formatting.

As a consequence, the mobile device management application requests in signal 1 the CPC formatter application to convert the provisioning content into the applicable format for a given mobile device to be provisioned and identified by means of MSISDN and/or IMEI information.

A mobile device consists of a terminal type, a subscription and a SIM card type. IMEI contains information of terminal type and is a unique value and for a part it consists of a terminal type indicator. When the terminal type is known, the system can proceed and look up capabilities for this terminal type in TCR. MSISDN identifies the subscription.

Terminal type is read to be able to look up terminal capabilities in TCR. In TCR, there is in this connection read which OTA provisioning protocol that is supported by the terminal type and whether the actual data object to be provisioned is stored in the terminal.

Both capabilities for terminal and SIM card are needed to figure out. It is unique for the invention that the capabilities of both terminal and SIM card are combined to figure out on which format a provisioning content shall be formatted to for a particular device.

The CPC formatter retrieves the terminal type indicator out of e.g. the IMEI sent with signal 1 and looks the OTA provisioning protocol up in the TCR by means of signals 2 (request) and 3 (receiving the requested information). Now the particular OTA protocol, which has to be used for the provisioning of this particular mobile device is known.

In signals 4 and 5, the CPC formatter then looks up terminal type and SIM card type from the Subscription- and SIM card type relationship repository (SSR). In SSR, the SIM card type is read in order to perform the method of the invention.

The CPC formatter then looks up the provisioning content format of the OTA protocol by means of signals 6 and 7 the SIM Card Capabilities Repository (SCR). Then SIM card capabilities are read in SCR and whether the data object to be managed is stored.

Thereafter, CPC formatter fetches the generic format of the provisioning content form the PC repository in signals 8 and 9 and then in step 10 it converts the provisioning content from the generic format into the correct format (for example a wapprovisioningdoc.xml file) i.e. the format found to be the correct one (information in signal 6) for the actual mobile device in question.

In signal 11, the CPC formatter then returns the provisioning content on the applicable format to the server side DM application.

While the present invention has been described in accordance with preferred compositions and embodiments, it is to be understood that certain substitutions and alterations may be made thereto without departing from the spirit and scope of the following claims.

The invention claimed is:

1. A method for provisioning content formatting in a device management system so facilitate provisioning of mobile devices of different capabilities with contents in the device management system in a mobile network infrastructure, comprising:
   providing the mobile device with a terminal and a module with subscriber information and the device management system comprising a device management application and repositories,
   initiating the device management application in the device management system to perform provisioning content formatting,
   determining capabilities of the terminal by looking up the terminal in a database,
   determining capabilities of the module by looking up the subscriber information and matching a subscription, associate with the subscriber information, with the module, based on the capabilities of the terminal and the capabilities of the module, determining an applicable provisioning content format for the mobile device, and
   the device management application obtaining a generic format of a provisioning content from a provisioning content repository (PC) and converting she provisioning content from the generic format into the applicable provisioning content format for the mobile device.

2. The method of claim 1 further comprising the steps of storing a content into a repository of the device management system, before initiating provisioning content formatting, whereby the initiation of the device management capabilities takes place by formatting the stored provisioning content into an applicable provisioning content format being found to he a format of the mobile device.

3. The method of claim 2 further comprising the steps of storing the provisioning content in the repository of the device management system in a generic format.

4. The method of claim 3 further comprising the steps of the device management application converting the provisioning content stored in the generic format into the applicable provisioning content format of the mobile device.

5. The method of claim 1 further comprising the steps of providing the provisioning content with connectivity parameters for a service.

6. The method of claim 1 further comprising the steps of providing the provisioning content with a data parameter subject to a provisioning by the device management system.

7. The method of claim 1 further comprising the steps of the device management application identifying the mobile device to be provisioned by means of Mobile Station Integrated Service Digital Network Number (MSISDN) and/or International Mobile Equipment Identity (IMEI).

8. The method of claim 7 further comprising the steps of the device management application retrieving a terminal type out of the IMEI and looking up a corresponding Over-The-Air (OTA) provisioning protocol and a provisioning content format of the OTA protocol from a Terminal Capabilities Repository (TCR) and thereafter the device management application converting the provisioning content into a correct format for the mobile device.

9. The method of claim 7 further comprising the steps of the device management application retrieving the subscriber out of the MSISDN and looking up the SIM card type from a subscription and SIM card type relationship repository (SSP) and then a corresponding Over-The-Air (OTA) provisioning protocol and the provisioning content format of the OTA provisioning protocol from the SIM Card Capabilities Repository (SCR) thereafter the device management application converting the provisioning content into a correct format for the mobile device.

10. The method of claim 7 further comprising the steps of the device management application looking up the provisioning content format corresponding to an OTA provisioning protocol, terminal type and/or SIM card type.

11. The method of claim 1 further comprising the steps of terminally bounding the provisioning content.

12. The method of claim 1 further comprising the steps of managing data objects.

13. The method of claim 1 further comprising the steps of SIM card bounding the provisioning content.

14. The method of claim 13 further comprising the steps of storing the data objects to be managed in files on the SIM card.

15. The method of claim 1, wherein the method further comprises the step of determining an OTA provisioning protocol based on a SIM card type and terminal type of the mobile device.

16. The method of claim 15 wherein the method further comprises the step of using the OTA provisioning protocol to determine whether the provisioning content is terminal-bound or SIM-card-bound.

17. The method of claim 1 wherein the method further comprises the step of using an OTA provisioning protocol to determine the provisioning content format.

18. The method of claim 17 wherein the method further comprises the step of 24 determining the provisioning content format by looking up the OTA provisioning protocol in a repository.

19. A system for formatting provisioning contents of different formats for devices of different capabilities by a device management system in a mobile network infrastructure, the devices to be provisioned the mobile device consisting of a terminal and a subscriber identity module (SIM), the system comprising:
   one or more device capabilities repositories,
   the repositories being adapted for storing information about capabilities for both the terminal and for SIM is stored, and
   a device management application used for a determination of correct provisioning content format based on capabilities of the mobile device and the device capabilities repositories, means for determining capabilities of the terminal to determine a terminal type,
   means for determining capabilities of the SIM by looking up a subscription of a subscriber in a subscription and SIM card type relationship repository (SSR) and means for matching the subscription with a SIM card type,
   means for determining an Over-The-Air (OTA) provisioning protocol,
   means for determining an applicable provisioning content format based on the OTA provisioning protocol, SIM card type and terminal type, and
   the device management application having means for obtaining a generic format of a provisioning content and converting the provisioning content from the generic format into the applicable provisioning content format for the mobile device.

20. The system of claim 19 wherein the device capabilities repositories consists of a terminal capabilities repository storing information about provisioning protocols to be used in provisioning and/or about provisioning content formats each mobile terminal type is provisioned by.

21. The system of claim 19 wherein one of the device capabilities repositories consists of a subscription and SIM card capabilities repository storing information about data objects available on a SIM card type.

22. The system of claim 19 wherein one of the device capabilities repositories consists of a subscription and SIM card type relationship repository storing information about capabilities of a SIM card type for a particular subscription.

23. The system of claim 19 wherein one of the repositories consists of a device identity repository storing mobile device identities as identified by a terminal identity and a subscription identity.

24. The system of claim 19 wherein one of the device capabilities repositories consists of a repository storing content to be provisioned on the generic format administratively managed in the system.

25. The system of claim 19 wherein the device management application has means for executing conversion from the generic format into a provisioning content format that fits capabilities of a particular mobile device consisting of subscription, terminal and SIM card.

26. A method for provisioning content formatting in a device management system, comprising:
providing a mobile device having a terminal and a module with subscriber information,
determining capabilities of the terminal by looking up the terminal in a database,
determining capabilities of the module,
based on the capabilities of the terminal and the capabilities of the module, determining an applicable provisioning content format for the mobile device,
obtaining a generic format of a provisioning content, and
converting the provisioning content from the generic format into the applicable provisioning content format for the mobile device based on the capabilities of the terminal and the module.

27. A method for provisioning content formatting in a device management system, comprising:
providing a mobile device having a terminal and a module with subscriber information,
determining capabilities of the terminal and the module,
determining whether the provisioning content is terminal-bound or module-bound,
when the provisioning content is terminal-bound, determining an OTA provisioning protocol for the terminal,
when the provisioning content is module-bound, determining an OTA provisioning protocol for the module,
determining an applicable provisioning content format for the mobile device,
converting the provisioning content from a generic format to the applicable provisioning format, and
provisioning the mobile device with the provisioning content in the applicable provisioning content.

* * * * *